No. 880,732. PATENTED MAR. 3, 1908.
E. R. HALSEY.
DRIVING MECHANISM.
APPLICATION FILED FEB. 16, 1907.

WITNESSES:

INVENTOR:
Edmund R. Halsey,
BY
Fraentzel and Richards,
ATTORNEYS.

No. 880,732.

PATENTED MAR. 3, 1908.

E. R. HALSEY.
DRIVING MECHANISM.
APPLICATION FILED FEB. 16, 1907.

WITNESSES:

INVENTOR:
Edmund R. Halsey,
BY
Fraentzel and Richards,
ATTORNEYS.

UNITED STATES PATENT OFFICE.

EDMUND R. HALSEY, OF SOUTH ORANGE, NEW JERSEY.

DRIVING MECHANISM.

No. 880,732.  Specification of Letters Patent.  Patented March 3, 1908.

Application filed February 16, 1907. Serial No. 357,702.

*To all whom it may concern:*

Be it known that I, EDMUND R. HALSEY, a citizen of the United States, residing at South Orange, in the county of Essex and State of New Jersey, have invented certain new and useful Improvements in Driving Mechanisms; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference, generally, to improvements in driving mechanisms for use mainly in automobiles by means of which the power from the engine is transmitted by means of a driving shaft to a gearing, such as a differential gear, which is arranged upon an axle of the vehicle; and the present invention relates, more particularly to a novel and simply constructed friction-drive for automobiles, and the like, used firstly for driving purposes, secondly, for speed-varying purposes, thirdly, for reversing the direction of rotation of the driven axle, and lastly, for the purpose of preventing any rotation of the axle of the vehicle without stopping the operations of the driving motor or engine and the transmission shaft which is driven from such source of power.

The present invention, therefore, has for its principal object to provide a friction-drive for automobiles, and the like, but which may also be used for other purposes, all with a view of providing a simple arrangement and construction of elements for producing variable speeds of an axle, or for causing the said axle which is to be driven to revolve in either direction without altering the speed of or the direction of the revolutions of the transmission shaft; and, furthermore, without the use of a clutch or the arresting of the revolutions of said transmission shaft, still enabling the driven axle to remain at a standstill, if desired.

A further object of this invention is to provide a novel friction-drive of the general character hereinafter set forth, in which the transmission shaft may also be capable of a longitudinal movement, so that the contacting of engaging friction-disks or plates may be entirely thrown out of their operative contact; and, another object of the invention is to provide a friction-drive of the general character shown, in which the transmission shaft is capable of a lateral oscillatory movement, at the will of the operator, such movement being in a plane at an angle to the vertical plane of the central longitudinal axis of the axle of the vehicle.

A further object of this invention is to provide a mechanism by means of which the power of the engine, or other source of motive power, may be steadily and constantly transmitted, so as not to cause any injury or breakage by any sudden or undue strain, to avoid the usual discomfort to the person or persons seated in the vehicle, when starting or stopping the same; and, also to relieve the shock or sudden strain which is occasioned during the bringing together the parts of the clutch-constructions usually employed.

Other objects of this invention not at this time more particularly enumerated will be clearly understood from the following detailed description of this invention.

With the various objects of the present invention in view, the same consists, primarily, in the novel friction-drive hereinafter set forth; and, furthermore, this invention consists in the various novel arrangements and combinations of the various devices and parts, as well as in the details of the construction of the same, all of which will be hereinafter more fully described and then finally embodied in the clauses of the claims which are appended to and which form an essential part of this specification.

The invention is clearly illustrated in the accompanying drawings, in which:—

Fig. 3 is a top or plan view of the said parts.

Similar characters of reference are employed in all of the above described views, to indicate corresponding parts.

Figure 1:
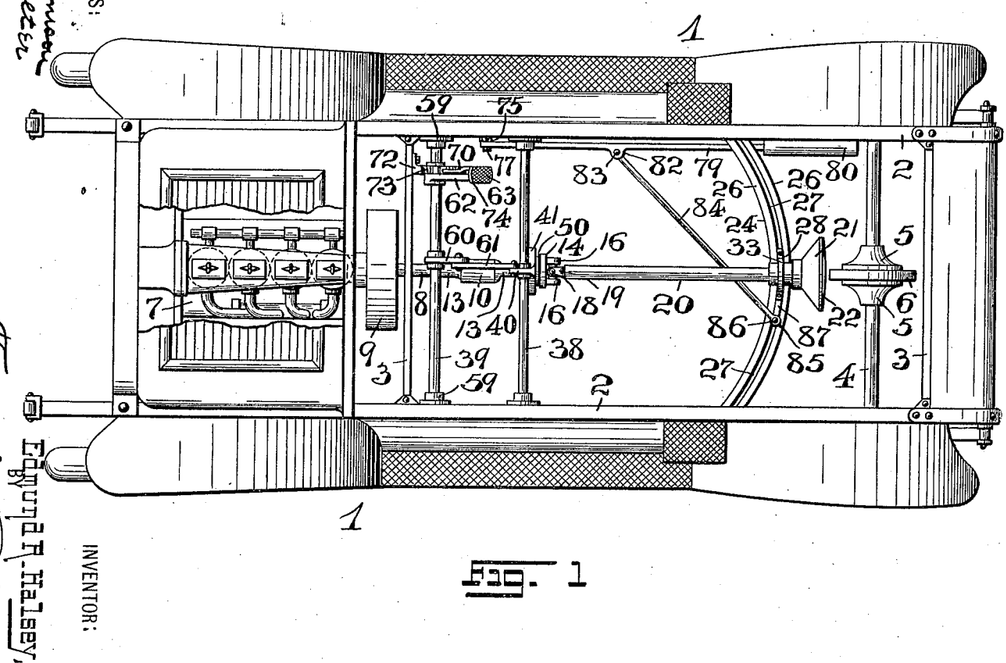
Figure 1 is a plan view of the chassis or main frame of the body of an automobile, showing in a more general or diagrammatical manner one arrangement of my novel friction-drive, arranged between the source of power and an axle of the vehicle, which is to be driven, the various parts of the friction-drive being shown in their normal initial positions.

Referring now to the several figures of the drawings, the reference-character 1 indicates the chassis or main frame of the lower body of an automobile, 2 are the longitudinally extending side beams, and 3 are the usual cross-beams or bars, all shown more particularly in Fig. 1 of the drawings.

Figure 2:
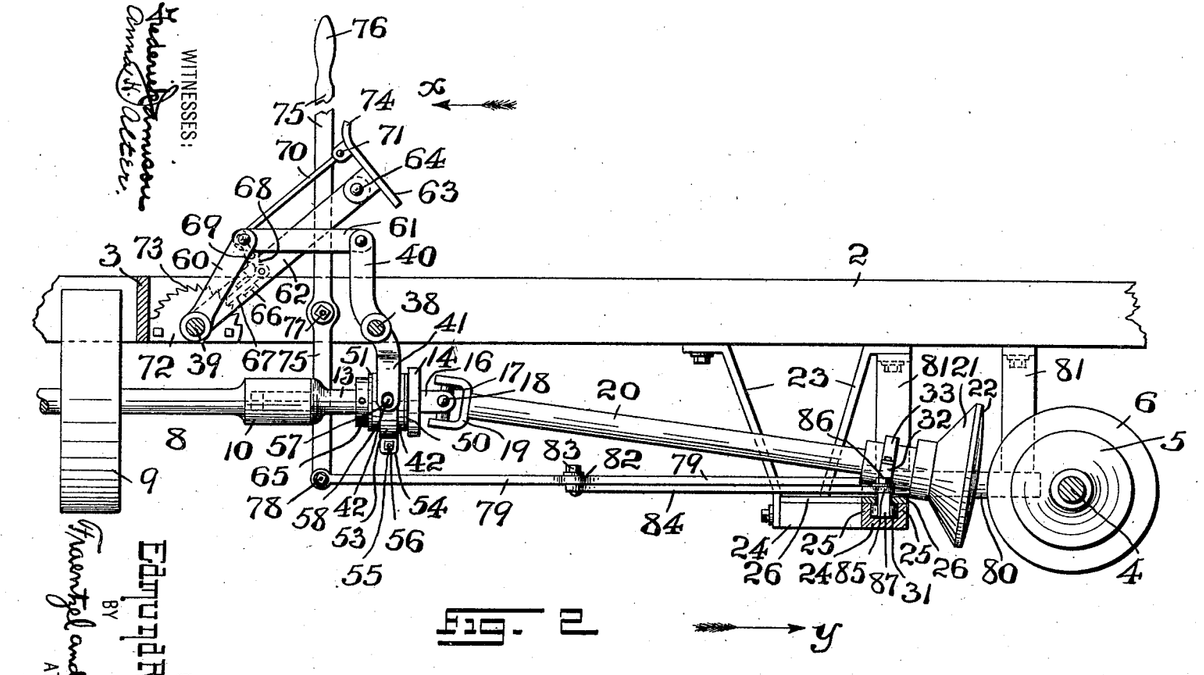
Fig. 2 is a side view of the friction-drive, and mechanism for operating the same, said view illustrating also in side elevation a part of the power-driven shaft and a fly-wheel thereon, the rear axle of the vehicle and a grooved truss or channeled guide-bar being represented in transverse section, and a portion of one of the side beams of the main frame or chassis being indicated in the manner shown.

The friction-drive is illustrated on an enlarged scale in Figs. 2 and 3 of the drawings, in connection with an axle 4 of the vehicle and its housings 5, in which are contained the usual differential gears, a suitable friction disk or plate 6 being mounted upon said axle at a point centrally between the respective end-portions of the axle.

Referring now to the several figures of the drawings, the reference-character 7 indicates any suitable construction of motor, steam-engine, or other suitable prime-mover, 8 being the power-driven or motor-shaft, and 9 a suitable fly-wheel mounted upon said shaft. At its free end, the said shaft 8 has an enlargement 10 which is provided with a receiving socket 11, said socket being of an angular and preferably square cross-section, substantially as illustrated.

Slidably arranged within said angular or square-shaped receiving socket 11 is a correspondingly formed angular or square-shaped end-member 12 of a short shaft-member or element 13, which is provided upon its opposite free end with a plate or disk-shaped portion 14 and is formed upon its squared end-portion with an annular-shoulder 15, substantially in the manner represented in the several figures of the drawings. The plate or disk-shaped portion 14 is provided with a pair of posts or lugs 16, between and across which extends a rod or bar 17. A second rod or bar 18 is connected in an oscillatory manner with said rod or bar 17, so as to extend at right angles from the opposite sides of the rod or bar, and operatively connected with the opposite ends of the rod or bar 18 is a yoke 19, all of said parts providing what is ordinarily termed a knuckle-joint. Suitably connected with or secured to said yoke 17 is the one end of a transmission shaft 20 of the friction-drive, said shaft extending longitudinally between the two side-beams of the chassis and being capable of a lateral movement upon either side of the longitudinal central axis of the chassis, substantially as and for the purposes to be presently more fully described. Upon its opposite free end the transmission shaft 20 is provided with a suitable and preferably cone-shaped member or element 21 having a slightly convexed friction or contact producing disk or plate 22. In its normal initial position this disk or plate is out of operative contact-making engagement with the cylindrical peripheral edge of the previously mentioned friction-disk or plate 6, substantially as illustrated in the several figures of the drawings.

Suitably connected with the two longitudinally extending side-beams 2 of the chassis, and preferably suspended from said beams by means of suitably constructed hangers, as 23, is a channeled truss or guide-bar 24. This guide-bar or truss is usually U-shaped in cross-section, and is bent in an arc-shaped manner, the curvature of the arc being such that it forms part of a circle which has its center located in the central axis of the knuckle-joint, being the point of intersection of the two longitudinal central axes of the respective rods or bars 17 and 18. Upon each upwardly extending rib or portion 25 of said truss or guide-bar 24 is secured a correspondingly curved plate 26, the two plates 26 each having an edge-portion extending beyond each rib or portion 25, and over the channel of the truss, said projecting edge-portions forming an arc-shaped opening 27, substantially as illustrated in Figs. 1, 2, 3, 4 and 6 of the drawings.

Figure 4:
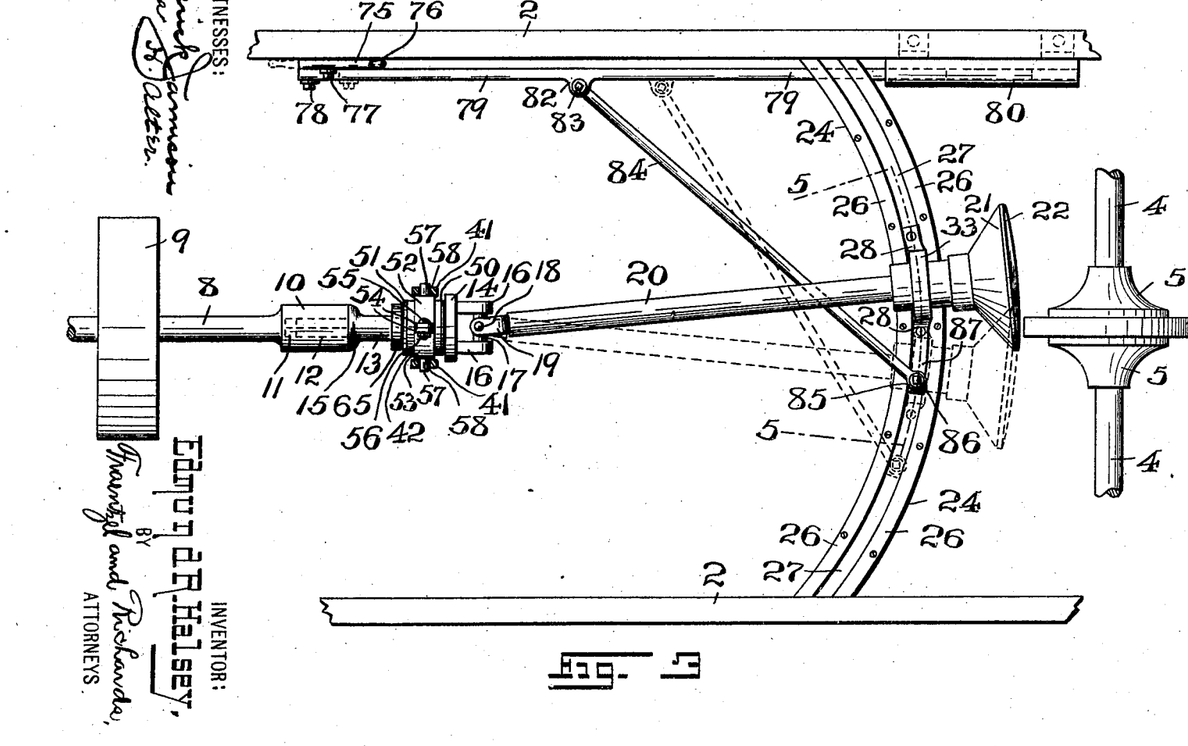
Fig. 4 is a transverse section of the axle which is to be driven and of the grooved truss or channeled guide-bar, with a portion of the friction-drive and a modified form of friction wheel shown in side elevation, said view indicating also in side elevation a system of power-transmission gears for transmitting the rotary motion of said friction-disk to said axle of the vehicle.
Figures 4, 5, 6, 7, 8:
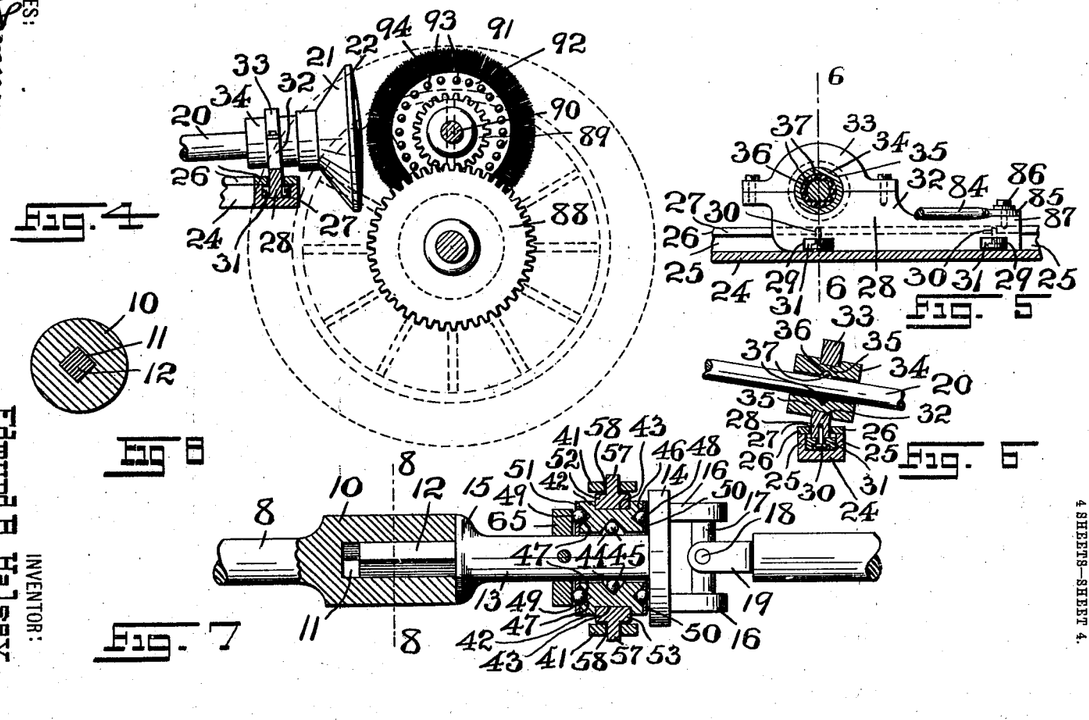
Fig. 5 is a detail sectional representation taken on line 5—5 in Fig. 3 of the drawings.
Fig. 6 is a transverse section, taken on line 6—6 in said Fig. 5.
Fig. 7 is a detail view of the end-portion of the power-driven shaft, a portion of the transmission shaft of the friction-drive, and the means of slidably and operatively connecting said shafts, a portion of the said power-driven shaft being shown in longitudinal vertical section, said view showing in connection therewith, and in section, a yoke-device employed for the purposes of producing a reciprocatory longitudinal movement of the transmission shaft.
Fig. 8 is a vertical cross-section taken on line 8—8 in said Fig. 7.

Movably arranged between the two ribs or portions 25 of the truss or guide-bar 24 is a slide or element 28, said slide extending upwardly through the said arc-shaped opening 27, and being angularly inclined, substantially as shown in Fig. 6 of the drawings. In its lower portion, the slide is made with suitable recesses 29, usually two of them, in each of which is rotatably arranged upon a pin 30, an anti-friction wheel or roller 31. These rollers 31 are slightly larger in diameter than the width of the slide within the channel of said truss or guide-bar, so that during any upward movement of the slide the marginal edge-portions of the rollers are brought against the lower faces of the projecting parts of the plates 26, so that it will be impossible to displace the slide from its operative position upon the truss or guide-bar 24. Between the two retaining or bearing members 32 and 33 of the slide, the same forming a box or bearing, is a sleeve 34, said sleeve being made with an annular groove 35 fitted in said bearing, whereby the opposite enlarged end-portions of the sleeve are fitted upon the opposite faces of the bearing or box to prevent any lateral displacement of the sleeve, as will be clearly evident. The tubular portion of said sleeve is formed with an annular groove or channel 36 which provides a suitable raceway for anti-friction balls or rollers 37 between which the previously mentioned transmission shaft 20 revolves in the manner of any usual ball-bearing.

To produce the longitudinal reciprocatory movements of the transmission shaft, so as to bring the friction disks or plates into their operative engagement or to separate them, I have provided a pair of shafts 38 and 39, the shaft 38 having suitably mounted thereon a lever 40, said lever being provided upon its lower end with a yoke 41. Upon the shaft member or element 13 is an annular sleeve-like member 42 which is provided with an external annular groove 43, and an internal annular raceway 44 for the arrangement of the anti-friction balls 45 between which the shaft-member 13 revolves. The member 42 is also made with other raceways 46 and 47, for the arrangement of series of balls 48 and 49, placed in the respective raceways, and held therein against displacement by means of plates 50 and 51 which are provided with a series of holes through which portions of the said balls project, substantially as illustrated in Fig. 7 of the drawings. In the previously mentioned annular groove 43 of the sleeve-like member 42 are fitted a pair of semi-circular members 52 and 53, said members being provided with perforated end-lugs 54, the same being secured together by means of bolts 55 and nuts 56, as illustrated in Figs. 2 and 3 of the drawings. Connected with suitable studs or pins 57 of each semi-circular member 52 and 53 are the end-portions 58 of the yoke 41. Mounted upon the shaft 39 which has an oscillatory motion in bearings or sockets 59 arranged upon the longitudinally extending side-bars 2 of the chassis is a crank-arm 60, and pivotally connecting the upper end of the crank-arm 60 and the lever 40 is a connecting rod or link 61. A foot-lever is also secured upon said shaft 39, said foot-lever being provided at its upper end with a suitable foot-piece 63 which is preferably pivotally connected with said lever 62 by means of a pin 64.

It will readily be understood from an inspection of Fig. 2 of the drawings, that any pressure from the foot of the operator upon the foot-piece 63, in the direction of the arrow x, will through the system of levers and the parts which are arranged upon the shaft-member 13, between the plate or disk-shaped portion 14 and a collar 65 secured upon said shaft-member, produce a movement of said member 13 and the transmission-shaft 20 in the direction of the arrow y in said Fig. 2. In this manner the friction disk or plate 22 and the friction-disk or plate 6 are effectively brought into their operative engagement, and the rotary motion of the shaft 20 is transmitted to the axle 4.

To maintain a positive engagement of said disks or plates 22 and 6, I have provided the foot-lever 62 with a guide 66 in which is movably arranged a holding-dog 67. Pivotally connected with the upper end of said dog is an arm 68 which is adapted to oscillate upon a fulcrum 69 of the foot-lever 62. Pivotally connected with the opposite end of the arm 68 is a rod or link 70, having its upper end pivoted at 71 to the foot-piece 63. The lower chamfered end of the dog 67 is in slidable engagement with the serrated or toothed edge 73 of a plate 72, so as not to interfere with the movements of the parts in the direction of the arrow x, but positively preventing any backward movements of the parts in an opposite direction.

To release the two friction-disks or plates 22 and 6 from their frictional contact, all that is necessary is to produce a slight downward pressure upon a toe-piece 74 of the foot-piece 63, whereby the lower end of the dog 67 is lifted from its holding engagement with the serrations or teeth of the plate 72, and the various parts will readily move back to their normal initial positions, thus producing the disengagement of the two friction-disks or plates as will be clearly evident. Now, to produce a lateral movement of the transmission shaft 20 and its parts, as well as of the slide or element 28 in the channeled truss or guide-bar 24, a lever or rod 75 which is provided with a handle 76 is arranged upon a pin 77 extending from the side of the bar 2. Pivotally attached by means of a pin 78 upon the lower end of said lever or rod 75 is a rearwardly extending rod 79, said rod having its rear end extending into and slidably arranged within a guide 80, suitably secured by means of a bracket 81, or other fastening means, to said side-bar 2, or other part of the frame of the vehicle. The rod or bar 79 is also provided with a perforated ear or lug 82 to which is pivotally secured by means of a pin or bolt 83 an actuating rod or link 84. This rod or link extends at an angle beneath the main frame and has an eye 85 which is secured in an oscillatory manner, by means of a stud, bolt or pin 86, to the end-portion 87 of the slide or element 28, substantially as illustrated in the several figures of the drawings.

The general movements and operations of the various devices and parts will be clearly understood from an inspection of Figs. 1, 2 and 3 of the drawings, and need not be more particularly described. Suffice it to say, that when the parts are in the positions shown in Fig. 1, although the two friction-disks or plates 22 and 6 may be in contact, still there will be no rotative movement of the disk 6, because of the fact, that the point of the peripheral contact of the disk 6 is in the center of the disk 22; but, when the parts are moved laterally, to either side, as indicated in Fig. 3, and the disk 22 made to contact with the periphery of the disk 6, the latter disk will be caused to rotate in either direction, according to the direction of the lateral movement of the shaft 20 and its disk 22, as the case may be, the speed of rotation of the disk 6, of course, varying according to the radial distance that the said disk 22 is moved to either side of the peripheral edge of the disk 6, as will be clearly understood.

Referring now to Fig. 4 of the drawings, I have shown the axle of the vehicle provided with a friction drive of a modified form of construction. In this device, the axle 4 has mounted thereon a gear wheel 88 and in mesh with this gear is a pinion 89 which is arranged upon an auxiliary shaft 90, upon which shaft is mounted a friction device 91. This device 91 is made somewhat different from the friction-disk 6, previously mentioned, and it consists of a pair of plates or disks 92 between which are secured by means of rivets, bolts, or pins 93, the inner end-portions of wire-like members 94, having great resiliency, and having their outer end-portions adapted to engage in frictional contact with the friction-disk 22, when it is desired to produce the revolutions of the axle of the vehicle, and the resiliency of said members 94 preventing any slipping of the parts, when in operative engagement, as will be clearly evident.

I claim:—

1. In a friction-drive, the combination, with an axle which is to be driven, of a friction device connected with said axle, a driving-shaft, a transmission shaft operated from said driving-shaft, a friction-disk at the opposite end of the transmission shaft, and means for producing a longitudinal reciprocatory movement of the transmission shaft to bring the friction disk of said shaft in engagement with the friction device of the axle, and mechanism for producing a lateral reciprocatory movement of the transmission shaft, comprising a channeled truss or guide bar, a slide upon said bar, a bearing on said slide in which said transmission shaft is revolubly arranged, and means for moving said slide back and forth upon said guide-bar, substantially as and for the purposes set forth.

2. In a friction-drive, the combination, with an axle which is to be driven, of a friction device connected with said axle, a driving-shaft, a transmission shaft operated from said driving-shaft, a friction-disk at the opposite end of the transmission shaft, and means for producing a longitudinal reciprocatory movement of the transmission shaft to bring the friction disk of said shaft in engagement with the friction device of the axle, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, consisting of a pivoted operating lever, a longitudinally movable rod or bar connected with said lever, and an annularly arranged link between said rod or bar and said slide, substantially as and for the purposes set forth.

3. In a friction-drive, the combination, with an axle which is to be driven, of a friction-device connected with said axle, a driving shaft, a transmission shaft operated from said driving shaft, a friction-disk at the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, and a foot-piece on said foot-lever, substantially as and for the purposes set forth.

4. In a friction-drive, the combination, with an axle which is to be driven, of a friction-device connected with said axle, a driving shaft, a transmission shaft operated from said driving shaft, a friction-disk at the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, and a foot-piece on said foot-lever, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, substantially as and for the purposes set forth.

5. In a friction-drive, the combination, with an axle which is to be driven, of a friction-device connected with said axle, a driving shaft, a transmission shaft operated from said driving shaft, a friction-disk at the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, and a foot-piece on said foot-lever, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, consisting of a pivoted operating lever, a longitudinally movable rod or bar connected with said lever, and an angularly arranged link between said rod or bar and said slide, substantially as and for the purposes set forth.

6. In a friction-drive, the combination, with an axle which is to be driven, of a friction-device connected with said axle, a driving shaft, a transmission shaft operated from said driving shaft, a friction-disk at the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, a foot-piece pivotally connected with said foot-lever, and means operated from said foot-piece for locking the parts in the engaged relations, substantially as and for the purposes set forth.

7. In a friction-drive, the combination, with an axle which is to be driven, of a friction-device connected with said axle, a driving-shaft, a transmission shaft operated from said driving shaft, a friction-disk at the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, a foot-piece pivotally connected with said foot-lever, and means operated from said foot-piece for locking the parts in the engaged relations, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, substantially as and for the purposes set forth.

8. In a friction-drive, the combination, with an axle which is to be driven, of a friction-device connected with said axle, a driving shaft, a transmission shaft operated from said driving shaft, a friction-disk at the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, a foot-piece pivotally connected with said foot-lever, and means operated from said foot-piece for locking the parts in engaged relations, and mechanism for producing a lateral reciprocatory movement of the transmission shaft, comprising a channel truss or guide-bar, a slide upon said bar, a bearing on said slide in which said transmission shaft is revolubly arranged, and means for moving said slide back and forth upon said guide-bar, consisting of a pivoted operating lever, a longitudinally movable rod or bar connected with said lever, and an angularly arranged link between said rod or bar and said slide, substantially as and for the purposes set forth.

9. In a friction-drive, the combination, with an axle which is to be driven, of a friction-device connected with said axle, a driving shaft, a transmission shaft operated from said driving shaft, a friction-disk at the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, a foot-piece pivotally connected with said foot-lever, and means operated from said foot-piece for locking the parts in their engaged relations, consisting of a serrated or toothed retaining-plate, a dog having a portion in engagement with the serrated or toothed portion of the retaining-plate, an arm fulcrumed on said foot-lever, said arm being pivotally connected at one end to said dog, a toe-piece on said foot-piece, and a connecting rod between said toe-piece and said fulcrumed arm, substantially as and for the purposes set forth.

10. In a friction-drive, the combination, with an axle which is to be driven, of a friction-device connected with said axle, a driving shaft, a transmission shaft operated from said driving shaft, a friction-disk at the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, a foot-piece pivotally connected with said foot-lever, and means operated from said foot-piece for locking the parts in the engaged relations, consisting of a serrated or toothed retaining-plate, a dog having a portion in engagement with the serrated or toothed portion of the retaining-plate, an arm fulcrumed on said foot-lever, said arm being pivotally connected at one end to said dog, a toe-piece on said foot-piece, and a connecting rod between said toe-piece and said fulcrumed arm, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, substantially as and for the purposes set forth.

11. In a friction-drive, the combination, with an axle which is to be driven, of a friction-device connected with said axle, a driving shaft, a transmission shaft operated from said driving shaft, a friction-disk at the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, a foot-piece pivotally connected with said foot-lever, and means operated from said foot-piece for locking the parts in the engaged relations, consisting of a serrated or toothed retaining-plate, a dog having a portion in engagement with the serrated or toothed portion of the retaining-plate, an arm fulcrumed on said foot-lever, said arm being pivotally connected at one end to said dog, a toe-piece on said foot-piece, and a connecting rod between said toe-piece and said fulcrumed arm, mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, consisting of a pivoted operating lever, a longitudinally movable rod or bar connected with said lever, and an angularly arranged link between said rod or bar and said slide, substantially as and for the purposes set forth.

12. In a friction-drive, the combination, with an axle which is to be driven, of a friction device connected with said axle, a driving shaft, a short shaft-member slidably connected with said driving shaft, a knuckle-joint upon the front end of said shaft-member, a transmission-shaft operated from said knuckle-joint, a friction-disk upon the opposite end of the transmission shaft, and means for producing a longitudinal reciprocatory movement of the transmission shaft to bring the friction disk of said shaft in engagement with the friction device of the axle, substantially as and for the purposes set forth.

13. In a friction-drive, the combination, with an axle which is to be driven, of a friction device connected with said axle, a driving shaft, a short shaft-member slidably connected with said driving shaft, a knuckle-joint upon the front end of said shaft-member, a transmission-shaft operated from said knuckle-joint, a friction-disk upon the opposite end of the transmission shaft, and means for producing a longitudinal reciprocatory movement of the transmission shaft to bring the friction disk of said shaft in engagement with the friction-device of the axle, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, substantially as and for the purposes set forth.

14. In a friction-drive, the combination, with an axle which is to be driven, of a friction device connected with said axle, a driving shaft, a short shaft-member slidably connected with said driving shaft, a knuckle-joint upon the front end of said shaft-member, a transmission-shaft operated from said knuckle-joint, a friction-disk upon the opposite end of the transmission shaft, and means for producing a longitudinal reciprocatory movement of the transmission shaft to bring the friction disk of said shaft in engagement with the friction device of the axle, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, consisting of a pivoted operating lever, a longitudinally movable rod or bar connected with said lever, and an angularly arranged link between said rod or bar and said slide, substantially as and for the purposes set forth.

15. In a friction-drive, the combination, with an axle which is to be driven, of a friction device connected with said axle, a driving shaft, a short shaft-member slidably connected with said driving shaft, a knuckle-joint upon the front end of said shaft-member, a transmission-shaft operated from said knuckle-joint, a friction-disk upon the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, and a foot-piece on said foot-lever, substantially as and for the purposes set forth.

16. In a friction-drive, the combination, with an axle which is to be driven, of a friction device connected with said axle, a driving shaft, a short shaft-member slidably connected with said driving shaft, a knuckle-joint upon the front end of said shaft-member, a transmission-shaft operated from said knuckle-joint, a friction-disk upon the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, and a foot-piece on said foot-lever, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, substantially as and for the purposes set forth.

17. In a friction-drive, the combination, with an axle which is to be driven, of a friction device connected with said axle, a driving shaft, a short shaft-member slidably connected with said driving shaft, a knuckle-joint upon the front end of said shaft-member, a transmission-shaft operated from said knuckle-joint, a friction-disk upon the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, and a foot-piece on said foot-lever, mechanism for producing a lateral reciprocating movement of the transmission shaft, comprising a channeled truss or guide-bar, a slide upon said bar, a bearing on said slide in which said transmission shaft is revolubly arranged, and means for moving said slide back and forth upon said guide-bar, consisting of a pivoted operating lever, a longitudinally movable rod or bar connected with said lever, and an angularly arranged link between said rod or bar and said slide, substantially as and for the purposes set forth.

18. In a friction-drive, the combination, with an axle which is to be driven, of a friction device connected with said axle, a driving shaft, a short shaft-member slidably connected with said driving shaft, a knuckle-joint upon the front end of said shaft-member, a transmission-shaft operated from said knuckle-joint, a friction-disk upon the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, a foot-piece pivotally connected with said foot-lever, and means operated from said foot-piece for locking the parts in the engaged relations, substantially as and for the purposes set forth.

19. In a friction-drive, the combination, with an axle which is to be driven, of a friction device connected with said axle, a driving shaft, a short shaft-member slidably connected with said driving shaft, a knuckle-joint upon the front end of said shaft-member, a transmission-shaft operated from said knuckle-joint, a friction-disk upon the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, a foot-piece pivotally connected with said foot-lever, and means operated from said foot-piece for locking the parts in the engaged relations, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bars, substantially as and for the purposes set forth.

20. In a friction-drive, the combination, with an axle which is to be driven, of a friction device connected with said axle, a driving shaft, a short shaft-member slidably connected with said driving shaft, a knuckle-joint upon the front end of said shaft-member, a transmission-shaft operated from said knuckle-joint, a friction-disk upon the opposite end of the transmission shaft, and means for producing a longitudinal reciprocatory movement of the transmission shaft to bring the friction disk of said shaft in engagement with the friction device of the axle, consisting of a sleeve-like member provided with a ball-bearing, a pivoted lever provided with a yoke which is operatively connected with said sleeve-like member, a crank-arm, a link between said crank-arm and said lever, a foot-lever connected with said crank-arm, a foot-piece pivotally connected with said foot-lever, and means operated from said foot-piece for locking the parts in the engaged relations, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bars, consisting of a pivoted operating lever, a longitudinally movable rod or bar connected with said lever, and an angularly arranged link between said rod or bar and said slide, substantially as and for the purposes set forth.

21. In a friction-drive, the combination, with an axle which is to be driven, of a friction device connected with said axle, a driving shaft having a socketed enlargement, a short shaft-member having a portion slidably arranged in said socketed portion, a disk-shaped portion upon the opposite end of the shaft-member, and a collar secured to said shaft-member, a knuckle-joint connected with said disk-shaped portion, a transmission-shaft operated from said knuckle-joint, a friction-disk upon the opposite end of the transmission-shaft, a sleeve-like member upon said shaft-member, said sleeve-like member having annular channels or raceways, and balls in said raceways in rolling contact with the shaft-member, and with the disk-shaped portion and the collar of said member, and means connected with said sleeve-like member for producing a longitudinal reciproctaory movement of the transmission shaft to bring the friction disk of said shaft in engagement with the friction device of the axle, substantially as and for the purposes set forth.

22. In a friction-drive, the combination, with an axle which is to be driven, of a friction device connected with said axle, a driving shaft having a socketed enlargement, a short shaft-member having a portion slidably arranged in said socketed portion, a disk-shaped portion upon the opposite end of the shaft-member, and a collar secured to said shaft-member, a knuckle-joint connected with said disk-shaped portion, a transmission-shaft operated from said knuckle-joint, a friction-disk upon the opposite end of the transmission-shaft, a sleeve-like member upon said shaft-member, said sleeve-like member having annular channels or raceways, and balls in said raceways in rolling contact with the shaft-member, and with the disk-shaped portion and the collar of said member, and means connected with said sleeve-like member for producing a longitudinal reciprocatory movement of the transmission shaft to bring the friction disk of said shaft in engagement with the friction device of the axle, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, substantially as and for the purposes set forth.

23. In a friction-drive, the combination, with an axle which is to be driven, of a friction device connected with said axle, a driving shaft having a socketed enlargement, a short shaft-member having a portion slidably arranged in said socketed portion, a disk-shaped portion upon the opposite end of the shaft-member, and a collar secured to said shaft-member, a knuckle-joint connected with said disk-shaped portion, a transmission-shaft operated from said knuckle-joint, a friction-disk upon the opposite end of the transmission-shaft, a sleeve-like member upon said shaft-member, said sleeve like member having annular channels or raceways, and balls in said raceways, in rolling contact with the shaft-member, and with the disk-shaped portion and the collar of said member, and means connected with said sleeve-like member for producing a longitudinal reciprocatory movement of the transmission shaft to bring the friction disk of said shaft in engagement with the friction device of the axle, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, consisting of a pivoted operating lever, a longitudinally movable rod or bar connected with said lever, and an angularly arranged link between said rod or bar and said slide, substantially as and for the purposes set forth.

24. In a friction-drive, the combination, with an axle which is to be driven, of a friction device connected with said axle, a driving shaft having a socketed enlargement, a short shaft-member having a portion slidably arranged in said socketed portion, a disk-shaped portion upon the opposite end of the shaft-member, and a collar secured to said shaft-member, a knuckle-joint connected with said disk-shaped portion, a transmission-shaft operated from said knuckle-joint, a friction-disk upon the opposite end of the transmission-shaft, a sleeve-like member upon said shaft-member, said sleeve-like member having annular channels or raceways, and balls in said raceways in rolling contact with the shaft-member, and with the disk-shaped portion and the collar of said member, and means connected with said sleeve-like member for producing a longitudinal reciprocatory movement of the transmission shaft to bring the friction disk of said shaft in engagement with the friction device of the axle, consisting of a pivoted lever provided with a yoke which is operatively connected with said sleeve-like member, a crank-arm, a link between said crank-arm and said lever, a foot-lever connected with said crank-arm, and a foot-piece on said foot-lever, substantially as and for the purposes set forth.

25. In a friction-drive, the combination, of an axle which is to be driven, of a friction device connected with said axle, a driving shaft having a socketed enlargement, a short shaft-member having a portion slidably arranged in said socketed portion, a disk-shaped portion upon the opposite end of the shaft-member, and a collar secured to said shaft-member, a knuckle-joint connected with said disk-shaped portion, a transmission-shaft operated from said knuckle-joint, a friction-disk upon the opposite end of the transmission-shaft, a sleeve-like member upon said shaft-member, said sleeve-like member having annular channels or raceways, and balls in said raceways in rolling contact with the shaft-member and with the disk-shaped portion and the collar of said member, and means connected with said sleeve-like member for producing a longitudinal reciprocatory movement of the transmission shaft to bring the friction disk of said shaft in engagement with the friction device of the axle, consisting of a pivoted lever provided with a yoke which is operatively connected with said sleeve-like member, a crank-arm, a link between said crank-arm and said lever, a foot-lever connected with said crank-arm, and a foot-piece on said foot-lever, and mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, substantially as and for the purposes set forth.

26. In a friction-drive, the combination, with an axle which is to be driven, of a friction device connected with said axle, a driving shaft having a socketed enlargement, a short shaft-member having a portion slidably arranged in said socketed portion, a disk-shaped portion upon the opposite end of the shaft-member, and a collar secured to said shaft-member, a knuckle-joint connected with said disk-shaped portion, a transmission-shaft operated from said knuckle-joint, a friction-disk upon the opposite end of the transmission-shaft, a sleeve-like member upon said shaft-member, said sleeve-like member having annular channels or raceways, and balls in said raceways in rolling contact with the shaft-member and with the disk-shaped portion and the collar of said member, and means connected with said sleeve-like member for producing a longitudinal reciprocatory movement of the transmission shaft to bring the friction disk of said shaft in engagement with the friction device of the axle, consisting of a pivoted lever provided with a yoke which is operatively connected with said sleeve-like member, a crank-arm, a link between said crank-arm and said lever, a foot-lever connected with said crank-arm, and a foot-piece on said foot-lever, mechanism for producing a lateral reciprocatory movement of the transmission shaft, comprising a channeled truss or guide-bar, a slide upon said bar, a bearing on said slide in which said transmission shaft is revolubly arranged, and means for moving said slide back and forth upon said guide-bar, consisting of a pivoted operating lever, a longitudinally movable rod or bar connected with said lever, and an angularly arranged link between said rod or bar and said slide, substantially as and for the purposes set forth.

27. In a friction-drive, the combination, with a curved and channeled truss or guide-bar, of a slide movably arranged upon said truss, rollers on said slide in rolling contact with the inner faces of the channel of said truss, a roller-bearing connected with said slide, and a transmission shaft revolubly arranged in said roller-bearing, substantially as and for the purposes set forth.

28. In a friction-drive, the combination, with a curved and channeled truss or guide-bar, of a slide movably arranged upon said truss, rollers on said slide in rolling contact with the inner faces of the channel of said truss, a roller-bearing connected with said slide, and a transmission shaft revolubly arranged in said roller-bearing, a friction disk on said shaft, a friction-device with which said friction disk is adapted to be brought in operative engagement, an axle, and a system of gearing adapted to be set in motion by said friction device to revolve said axle, substantially as and for the purposes set forth.

29. In a friction-drive, the combination, with a curved and channeled truss or guide-bar, of a slide movably arranged upon said truss, a roller-bearing connected with said slide, a transmission-shaft revolubly arranged in said roller-bearing, and means for producing the slidable movement of said slide, consisting of a pivoted operating lever, a longitudinally movable rod or bar connected with said lever, and an angularly arranged link between said rod or bar and the slide, substantially as and for the purposes set forth.

30. In a friction drive, the combination, with an axle which is to be driven, of a friction device connected with said axle, a driving shaft, a transmission shaft operatively connected with said driving shaft, but having a longitudinally sliding movement independent of the driving shaft, said transmission shaft being provided with means adapted to be brought in operative engagement with the friction device, means for producing a longitudinal reciprocatory movement of said transmission shaft, for throwing the friction device into and out of active engagement, and means for producing lateral movements of the transmission shaft for varying the speeds and reversing the motion of the friction device, substantially as and for the purposes set forth.

31. In a friction drive, the combination, with an axle which is to be driven, of a friction device connected with said axle, a driving shaft, a transmission shaft, a means of pivotal connection at one end of said transmission shaft, and means for operatively connecting said means of pivotal connection with said driving shaft, but constructed to permit a longitudinally sliding movement of the transmission shaft independent of the driving shaft, means at the other end of said transmission shaft adapted to be brought in operative engagement with the friction device, means for producing a longitudinal reciprocatory movement of said transmission shaft, for throwing the friction device into and out of active engagement, and means for producing oscillatory lateral movements of the transmission shaft for varying the speeds and reversing the motion of the friction device, substantially as and for the purposes set forth.

32. In a friction drive, the combination with an axle which is to be driven, of a friction disk connected with said axle, a driving shaft, a transmission shaft operatively connected with said driving shaft, but having a longitudinally sliding movement independent of the driving shaft, a friction disk on said transmission shaft adapted to be brought in operative engagement with the friction disk on said axle, means for producing a longitudinal reciprocatory movement of said transmission shaft, for throwing the friction disk on said shaft into and out of active engagement with the friction disk on said axle, and means for producing lateral movements of said transmission shaft for varying the speeds and reversing the motion of the friction disk on said axle, substantially as and for the purposes set forth.

33. In a friction-drive, the combination with an axle which is to be driven, of a friction disk connected with said axle, a driving shaft, a transmission shaft, a means of pivotal connection at one end of said transmission shaft, and means for operatively connecting said means of pivotal connection with said driving shaft, but constructed to permit a longitudinally sliding movement of the transmission shaft independent of the driving shaft, a friction disk at the other end of said transmission shaft adapted to be brought in operative engagement with the friction disk on said axle, means for producing a longitudinal reciprocatory motion of said transmission shaft, for throwing the friction disk on said shaft into and out of active engagement with the friction-disk on said axle, and means for producing oscillatory lateral movements of the transmission shaft for varying the speeds and reversing the motion of the friction disk on said axle, substantially as and for the purposes set forth.

In testimony, that I claim the invention set forth above I have hereunto set my hand this 14th day of February, 1907.

EDMUND R. HALSEY.

Witnesses:
    FREDK. C. FRAENTZEL,
    FREDERICK JAMISON.